US012602523B2

(12) United States Patent
Ahamed Kattangere et al.

(10) Patent No.: US 12,602,523 B2
(45) Date of Patent: Apr. 14, 2026

(54) RACK-BASED DESIGN VERIFICATION AND MANAGEMENT

(71) Applicant: Hewlett Packard Enterprise Development LP, Houston, TX (US)

(72) Inventors: Rafiq Ahamed Kattangere, Bangalore (IN); Sripadwallabha Dattatraya Kollur, Bangalore (IN); Shantanu Porwal, Andover, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 987 days.

(21) Appl. No.: 17/825,769

(22) Filed: May 26, 2022

(65) Prior Publication Data

US 2023/0385477 A1     Nov. 30, 2023

(51) Int. Cl.
*G06F 30/20* (2020.01)
*G06F 30/18* (2020.01)
(Continued)

(52) U.S. Cl.
CPC .............. *G06F 30/20* (2020.01); *G06F 30/18* (2020.01); *G06F 2119/06* (2020.01); *G06F 2119/08* (2020.01)

(58) Field of Classification Search
CPC ...... G06F 30/18; G06F 30/20; G06F 2119/06; G06F 2119/08
(Continued)

(56) References Cited

U.S. PATENT DOCUMENTS

| | | | |
|---|---|---|---|
| 5,847,965 A | 12/1998 | Cheng | |
| 6,219,708 B1 * | 4/2001 | Martenson | .......... H04L 41/0213 |
| | | | 709/226 |

(Continued)

FOREIGN PATENT DOCUMENTS

| | | |
|---|---|---|
| CA | 2381832 A1 | 10/2002 |

OTHER PUBLICATIONS

Intangi, "Technical Sales Enablement Equip your channels with the Right toolset", available online at <https://web.archive.org/web/20170606210020/https://www.intangi.com/manufacturer.htm>, Jun. 6, 2017, 4 pages.

(Continued)

*Primary Examiner* — Andre Pierre Louis
(74) *Attorney, Agent, or Firm* — Yao Legal Services, Inc.

(57) ABSTRACT

Rack-based solution design and verification approaches are disclosed. A list of elements including at least computing resources, storage resources and connection resources for to a proposed data processing architecture is received. A physical layout of the computing resources and the storage resources is evaluated by a first set of microservices to parse configuration data for the computing resources and the storage resources and to evaluate a proposed configuration for the computing resources and the storage resources. Point-to-point connections between the computing resources and the storage resources in the proposed configuration are verified by a second set of microservices. The list of elements can be updated based on the evaluation of the physical layout and the point-to-point connections. A solution architecture is generated based on the updated list of elements, the physical layout, the verified point-to-point connections and the supply chain status information.

20 Claims, 5 Drawing Sheets

(51) Int. Cl.
   *G06F 119/06*        (2020.01)
   *G06F 119/08*        (2020.01)
(58) Field of Classification Search
   USPC ............................................................ 703/6
   See application file for complete search history.

(56)                      References Cited

U.S. PATENT DOCUMENTS

| | | | |
|---|---|---|---|
| 7,313,757 B2 | 12/2007 | Bradley et al. | |
| 8,667,383 B2 | 3/2014 | Schnitt | |
| 9,716,746 B2 | 7/2017 | Garg et al. | |
| 10,459,741 B2 | 10/2019 | Kadloor et al. | |
| 10,699,051 B1 | 6/2020 | Zhang et al. | |
| 10,885,250 B1 | 1/2021 | White et al. | |
| 11,023,646 B2 | 6/2021 | Subramaniam et al. | |
| 2008/0140469 A1* | 6/2008 | Iqbal ...................... | G06Q 10/04 |
| | | | 705/7.37 |
| 2012/0194555 A1 | 8/2012 | Byrnes | |
| 2016/0014073 A1* | 1/2016 | Reddy ................. | H04L 41/0897 |
| | | | 713/2 |

OTHER PUBLICATIONS

Intangi, "The Reseller Struggle", available online at <https://web.archive.org/web/20120916230254/https://www.intangi.com/reseller.htm>, Sep. 16, 2012, 2 pages.

* cited by examiner

218

NETWORK COMPONENT(S) 204

MANAGEMENT NETWORK COMPONENT(S) 206

GATEWAY COMPONENT(S) 208

STORAGE COMPONENT(S) 210

AVAILABLE RACK SPACE 212

FIRST TYPE SERVER(S) 214

SECOND TYPE SERVER(S) 216

RACK-BASED SOLUTION 202

322

EDGE NETWORK COMPONENT(S) 304

MANAGEMENT NETWORK COMPONENT(S) 306

CONTROL PLANE COMPONENT(S) 308

NETWORK COMPONENT(S) 310

FILE AND OBJECT STORAGE COMPONENT(S) 312

AVAILABLE RACK SPACE 314

FIRST TYPE SERVER(S) 316

SECOND TYPE SERVER(S) 318

ACCELERATOR COMPONENT(S) 320

RACK-BASED SOLUTION 302

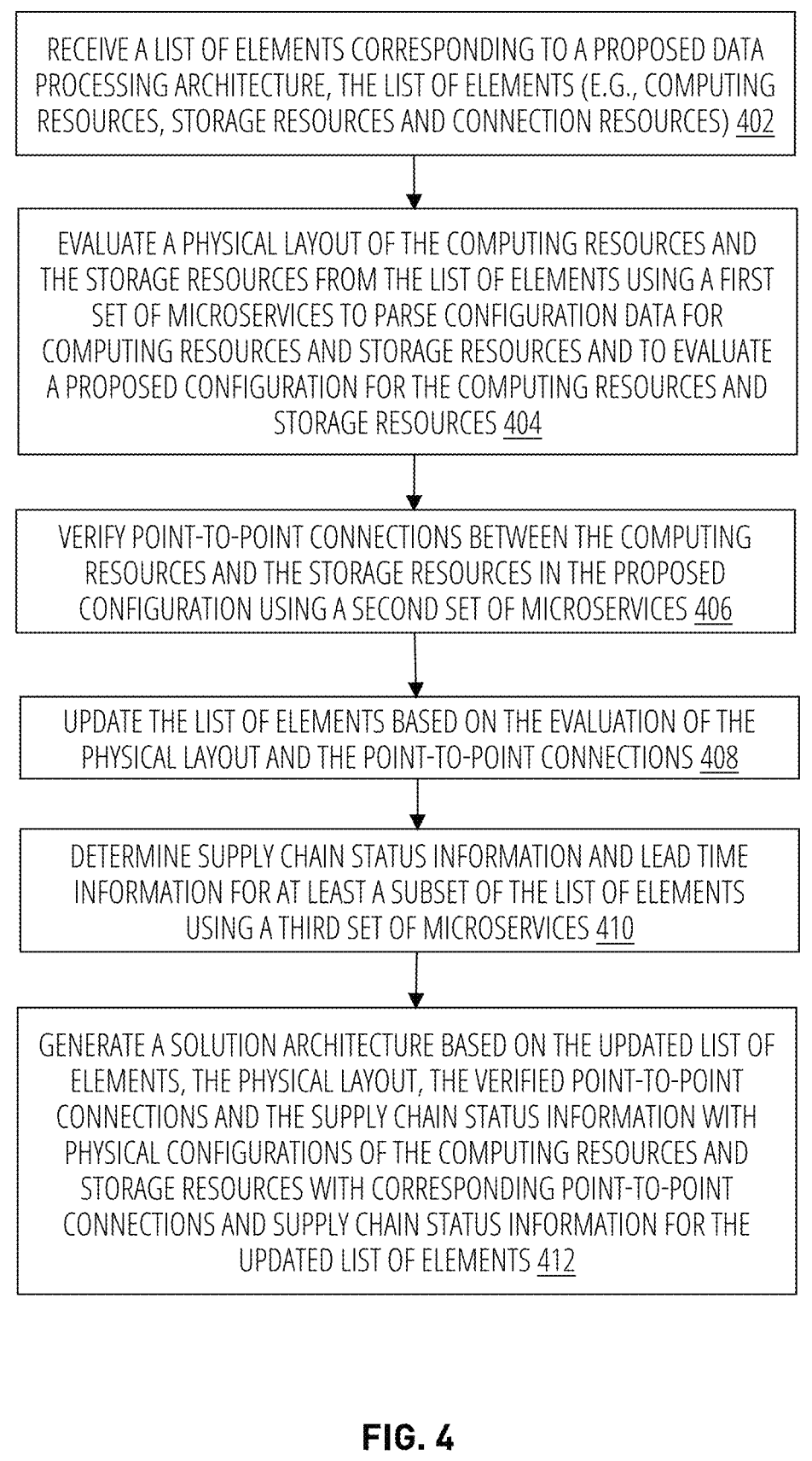

RECEIVE A LIST OF ELEMENTS CORRESPONDING TO A PROPOSED DATA PROCESSING ARCHITECTURE, THE LIST OF ELEMENTS (E.G., COMPUTING RESOURCES, STORAGE RESOURCES AND CONNECTION RESOURCES) <u>402</u>

EVALUATE A PHYSICAL LAYOUT OF THE COMPUTING RESOURCES AND THE STORAGE RESOURCES FROM THE LIST OF ELEMENTS USING A FIRST SET OF MICROSERVICES TO PARSE CONFIGURATION DATA FOR COMPUTING RESOURCES AND STORAGE RESOURCES AND TO EVALUATE A PROPOSED CONFIGURATION FOR THE COMPUTING RESOURCES AND STORAGE RESOURCES <u>404</u>

VERIFY POINT-TO-POINT CONNECTIONS BETWEEN THE COMPUTING RESOURCES AND THE STORAGE RESOURCES IN THE PROPOSED CONFIGURATION USING A SECOND SET OF MICROSERVICES <u>406</u>

UPDATE THE LIST OF ELEMENTS BASED ON THE EVALUATION OF THE PHYSICAL LAYOUT AND THE POINT-TO-POINT CONNECTIONS <u>408</u>

DETERMINE SUPPLY CHAIN STATUS INFORMATION AND LEAD TIME INFORMATION FOR AT LEAST A SUBSET OF THE LIST OF ELEMENTS USING A THIRD SET OF MICROSERVICES <u>410</u>

GENERATE A SOLUTION ARCHITECTURE BASED ON THE UPDATED LIST OF ELEMENTS, THE PHYSICAL LAYOUT, THE VERIFIED POINT-TO-POINT CONNECTIONS AND THE SUPPLY CHAIN STATUS INFORMATION WITH PHYSICAL CONFIGURATIONS OF THE COMPUTING RESOURCES AND STORAGE RESOURCES WITH CORRESPONDING POINT-TO-POINT CONNECTIONS AND SUPPLY CHAIN STATUS INFORMATION FOR THE UPDATED LIST OF ELEMENTS <u>412</u>

FIG. 4

PROCESSOR(S) <u>516</u>

INSTRUCTIONS TO RECEIVE A LIST OF ELEMENTS CORRESPONDING TO A PROPOSED DATA PROCESSING ARCHITECTURE, THE LIST OF ELEMENTS (E.G., COMPUTING RESOURCES, STORAGE RESOURCES AND CONNECTION RESOURCES) <u>502</u>

INSTRUCTIONS TO EVALUATE A PHYSICAL LAYOUT OF THE COMPUTING RESOURCES AND THE STORAGE RESOURCES FROM THE LIST OF ELEMENTS USING A FIRST SET OF MICROSERVICES TO PARSE CONFIGURATION DATA FOR COMPUTING RESOURCES AND STORAGE RESOURCES AND TO EVALUATE A PROPOSED CONFIGURATION FOR THE COMPUTING RESOURCES AND STORAGE RESOURCES <u>504</u>

INSTRUCTIONS TO VERIFY POINT-TO-POINT CONNECTIONS BETWEEN THE COMPUTING RESOURCES AND THE STORAGE RESOURCES IN THE PROPOSED CONFIGURATION USING A SECOND SET OF MICROSERVICES <u>506</u>

INSTRUCTIONS TO UPDATE THE LIST OF ELEMENTS BASED ON THE EVALUATION OF THE PHYSICAL LAYOUT AND THE POINT-TO-POINT CONNECTIONS <u>508</u>

INSTRUCTIONS TO DETERMINE SUPPLY CHAIN STATUS INFORMATION AND LEAD TIME INFORMATION FOR AT LEAST A SUBSET OF THE LIST OF ELEMENTS USING A THIRD SET OF MICROSERVICES <u>510</u>

INSTRUCTIONS TO GENERATE A SOLUTION ARCHITECTURE BASED ON THE UPDATED LIST OF ELEMENTS, PHYSICAL LAYOUT, VERIFIED POINT-TO-POINT CONNECTIONS AND SUPPLY CHAIN STATUS INFORMATION WITH PHYSICAL CONFIGURATIONS OF THE COMPUTING RESOURCES AND STORAGE RESOURCES WITH CORRESPONDING POINT-TO-POINT CONNECTIONS AND SUPPLY CHAIN STATUS INFORMATION <u>512</u>

SYSTEM <u>514</u>

RACK-BASED DESIGN VERIFICATION AND MANAGEMENT

BACKGROUND

Use of data centers is an approach to providing large amounts of computing power and/or data storage capacity. As the amount of computing power provided and/or the amount of data storage provided increases, the design of the data centers can quickly become very complex. In addition to being complex, different organizations have different needs that require different configurations of components. Thus, designing data centers (or similarly complex architectures) is an expensive and potentially error-prone process because of the large number of components available, the configurations and interactions of the components, etc. In order to provide the desired functionality, each of these components must be selected, interconnected, tested, verified, etc.

For example, an organization may require a relatively large number of virtual machines (VMs) with corresponding server, storage support and network support. As another example, an organization may require a relatively large number of processors and accelerator hardware with supporting control and management components. These examples require different configurations of components with corresponding interconnections.

One approach to data center design is to provide one or more pre-configured architectures that have been tested and are known to be sufficiently error free for an organization to select. However, many organizations requiring data centers have proprietary needs that may not be fully satisfied by available, pre-configured architectures. Thus, even when having the option to choose pre-configured, pre-verified architectures, an organization may require further customization, which requires interconnection, testing, verification, etc.

BRIEF DESCRIPTION OF THE DRAWINGS

To easily identify the discussion of any particular element or act, the most significant digit or digits in a reference number refer to the figure number in which that element is first introduced.

FIG. 4 is a flow diagram for one example technique for providing a solution designer mechanism.

FIG. 5 is a block diagram of one example of a processing system that can provide a solution designer mechanism.

DETAILED DESCRIPTION

Figure 1:
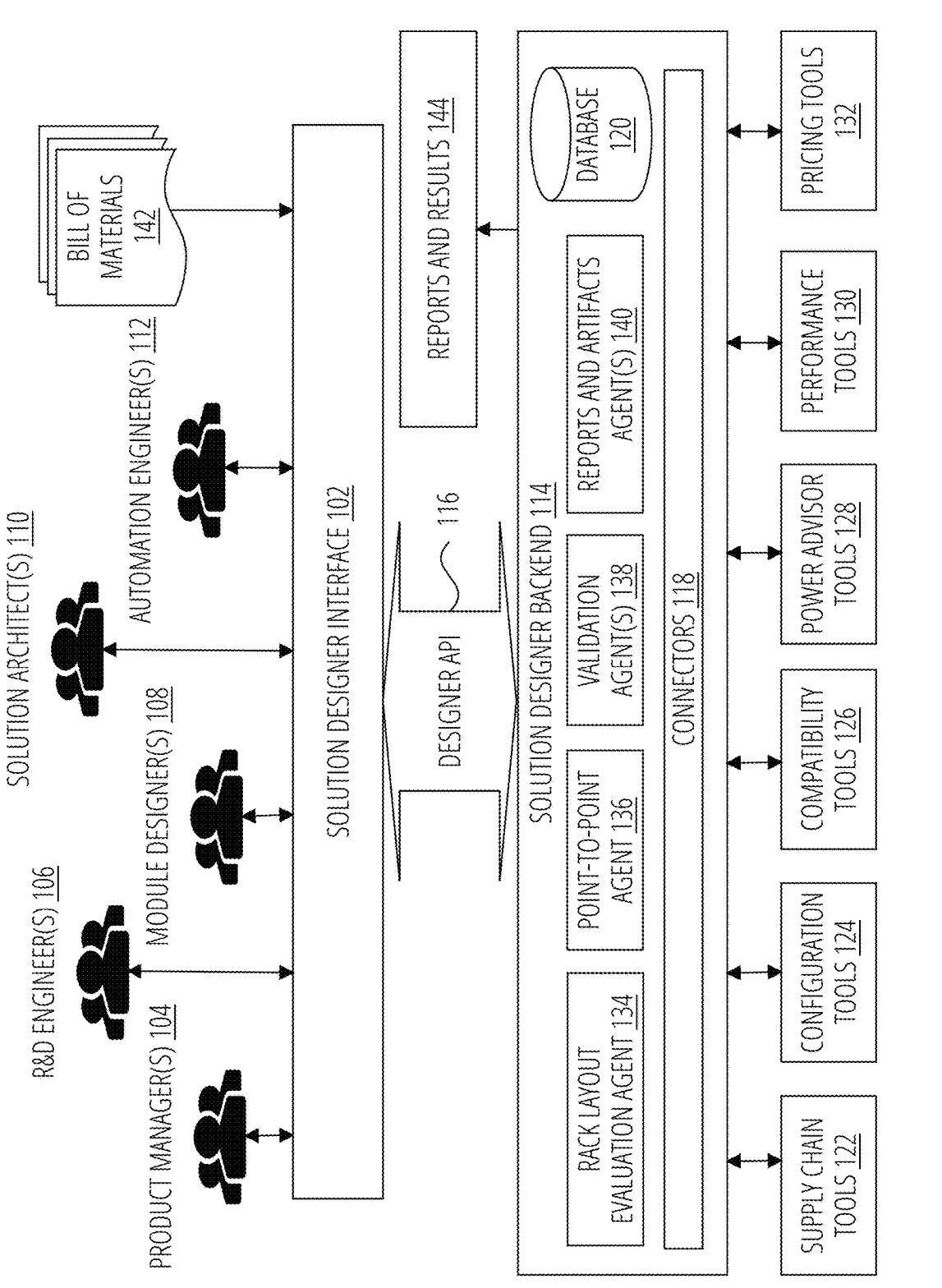
FIG. 1 is a block diagram of an example solution designer mechanism architecture.

Currently, complex data center solutions can take months to design, configure and deliver to customers. These data center solutions each include at least an infrastructure layout element, a platform layout element and an application services element. More specifically, a solution describes a configured architecture including at least a configuration of rack-mounted components such as servers, storage devices, gateway devices, rack management devices, power devices, accelerators, network interface components, edge network devices, control plane devices, etc.

For these data center solutions, design parameters include modules/components to be included, placement within rack structures, interconnection between modules/components, etc. The result of providing a custom design with these design parameters can be an unbuildable error if one or more design errors are encountered. Various unbuildable errors can include, for example, missing parts resulting in processing an incomplete order, no guidance on rack evaluations to indicate module placements, no point-to-point connections resulting in incorrect cabling (which can result in cascading issues), and/or no configuration data to indicate customer environmental changes, etc.

Currently, acquisition and delivery of customized data center solutions is a complex and error-filled process because there are insufficient offerings that support customization and validations for the customized solutions. For example, a customer may exclude specific modules (e.g., management network components) and those excluded modules may be excluded from a bill of materials (BoM), for example, but validation/verification mechanisms may not be appropriately updated to provide correct results. Correction could require manual modifications and/or verifications, which would be a complex and expensive solution.

Example approaches described below provide a solution designer mechanism that can minimize these issues by providing a design phase for solutions prior to ordering and/or manufacturing. The solution designer mechanisms described below can support custom rack elevations, optimized point-to-point cabling for selected modules (within and across racks), bill of materials validations (e.g., to find missing parts, missing cables), lead time management, and/or generation of relevant artifacts for supply chain/factory use. In an example, the solution designer mechanism can validate configurations and generate point-to-point cabling connection files that can be used by, for example, an automation engine to build/configure the customized solution. Access to the solution designer mechanism can be provided via an online portal, for example, that can be integrated with other verification/configuration/inventory management tools.

In an example, microservices are utilized to provide various functions for the rack-based solution design verification approach described. Microservices are small independent services that communicate over well-defined APIs and provide a specific service. Often microservices have their own technology stack including any database or management models. Groups of microservices can be configured to provide more complex architectures that provide more sophisticated functionality than the microservices individually provide. Use of microservices can result in a complex, dynamically adaptable architecture.

As described in greater detail below, various sets of microservices are configured to provide customized validation, customized point-to-point cabling design, supply chain analysis, and/or manufacturing/assembly/logistics files and information. By leveraging a customized designer environment using sets of microservices, customized data center solutions can be generated and implemented in a more efficient and more reliable manner.

FIG. 1 is a block diagram of an example solution designer mechanism architecture. Complex data center solutions can take months to design, test and deliver racks, cables and other components necessary to implement a desired data center solution. Streamlining various phases of this process can result in significant competitive advantages. The data center solutions each include at least an infrastructure layout element, a platform layout element and an application services element including a configuration of rack-mounted components such as servers, storage devices, gateway devices, rack management devices, power devices, accelerators, network interface components, edge network devices, control plane devices, etc.

The more customized a data center solution is, the more likely the proposed solution contains one or more errors that should be identified and/or rectified via verification, testing, etc. Errors that can result from customization (or other causes) can include, for example, missing components/parts, incorrect/inefficient rack placements, incorrect point-to-point cabling, lack of configuration data, etc.

In the examples that follow, verification of customized solutions can be provided via solution designer interface 102, solution designer backend 114 and various tools accessible via solution designer backend 114. In a design phase, complex customized data center solutions can be tested and verified using, for example, various configurations of microservices. In an example, designers can customize rack elevations, design optimized point-to-point cabling for each module within and across racks, run validations on the bill of materials to find missing parts/cables for reduced lead times, generate relevant artifacts for supply chain and/or factory notifications/pre-ordering using solution designer interface 102 and solution designer backend 114.

In an example, solution designer interface 102 can provide a graphical user interface (GUI) accessible by one or more designers including, for example, product manager(s) 104, research and development (R&D) engineer(s) 106, module designer(s) 108, solution architect(s) 110 and/or automation engineer(s) 112 to customize or design data center solutions.

Solution designer interface 102 can provide an online collaboration portal that allows various users (e.g., product manager(s) 104, R&D engineer(s) 106, module designer(s) 108, solution architect(s) 110, automation engineer(s) 112) to generate and/or import bill of materials 142 that represent a list of elements corresponding to a proposed data processing architecture to create a data center solution. The bill of materials can subsequently be rendered in rack layouts for solution architect(s) 110 to use during the design process. Solution designer interface 102 can interact with solution designer backend 114 via designer application program interface (API) 116 to provide the functionality described herein.

In one example, solution designer interface 102 and/or solution designer backend 114 can generate relevant artifacts for logistics and/or manufacturing processes. In an example, solution designer interface 102 and/or solution designer backend 114 can generate point-to-point cabling files that can be verified and used for configuration, manufacturing, assembly or similar purposes.

In an example, the design process can include multiple phases including, for example, design/customization of rack elevations, generation/modification of point-to-point cabling connections, validations, and review/cloning. When the phases of the design process are completed, the resulting solution can be assigned a unique identifier (Design ID) that can be associated with the solution through the subsequent manufacturing/delivery/deployment processes.

Figure 2:
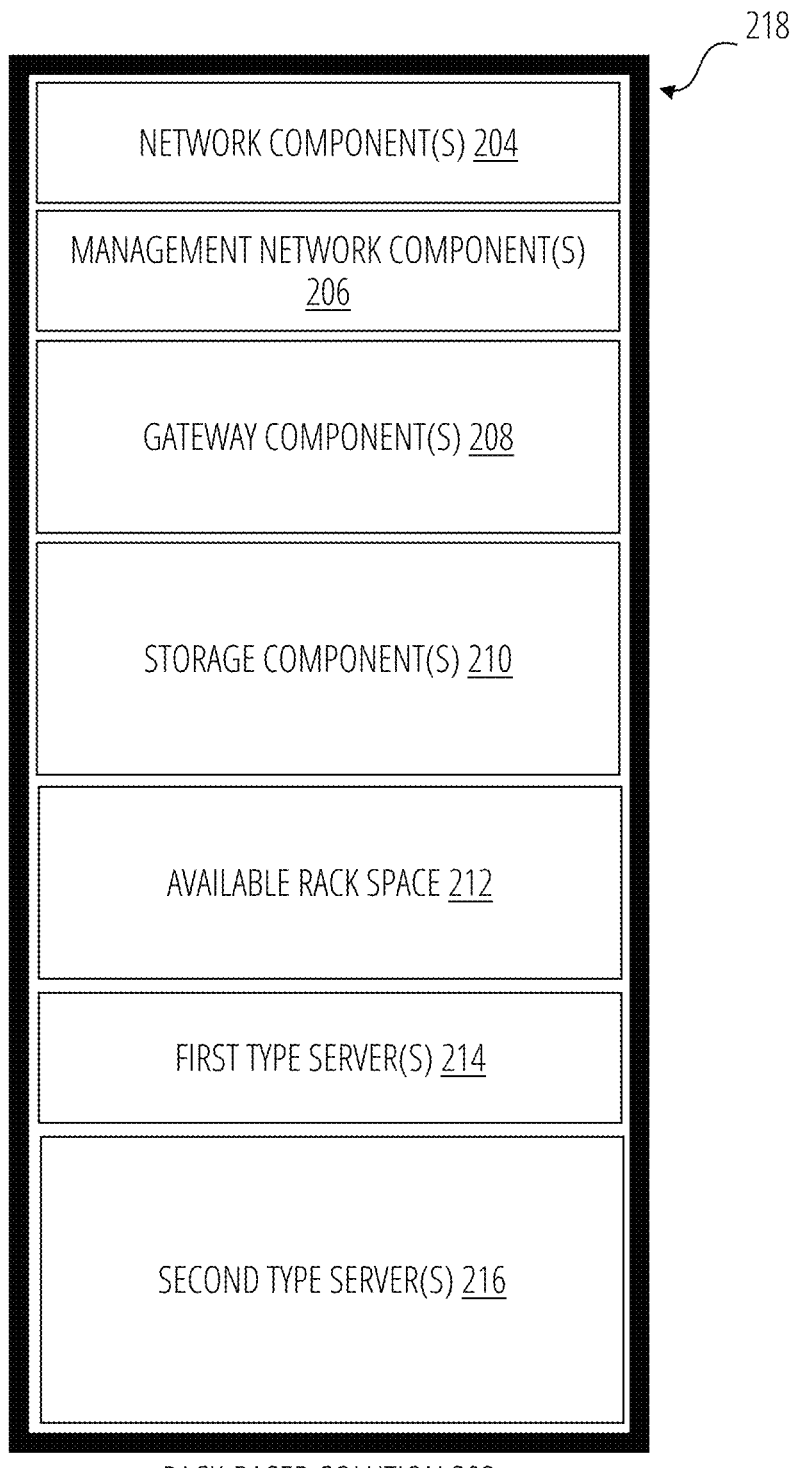
FIG. 2 is an example illustration of a rack-based solution.
Figure 3:
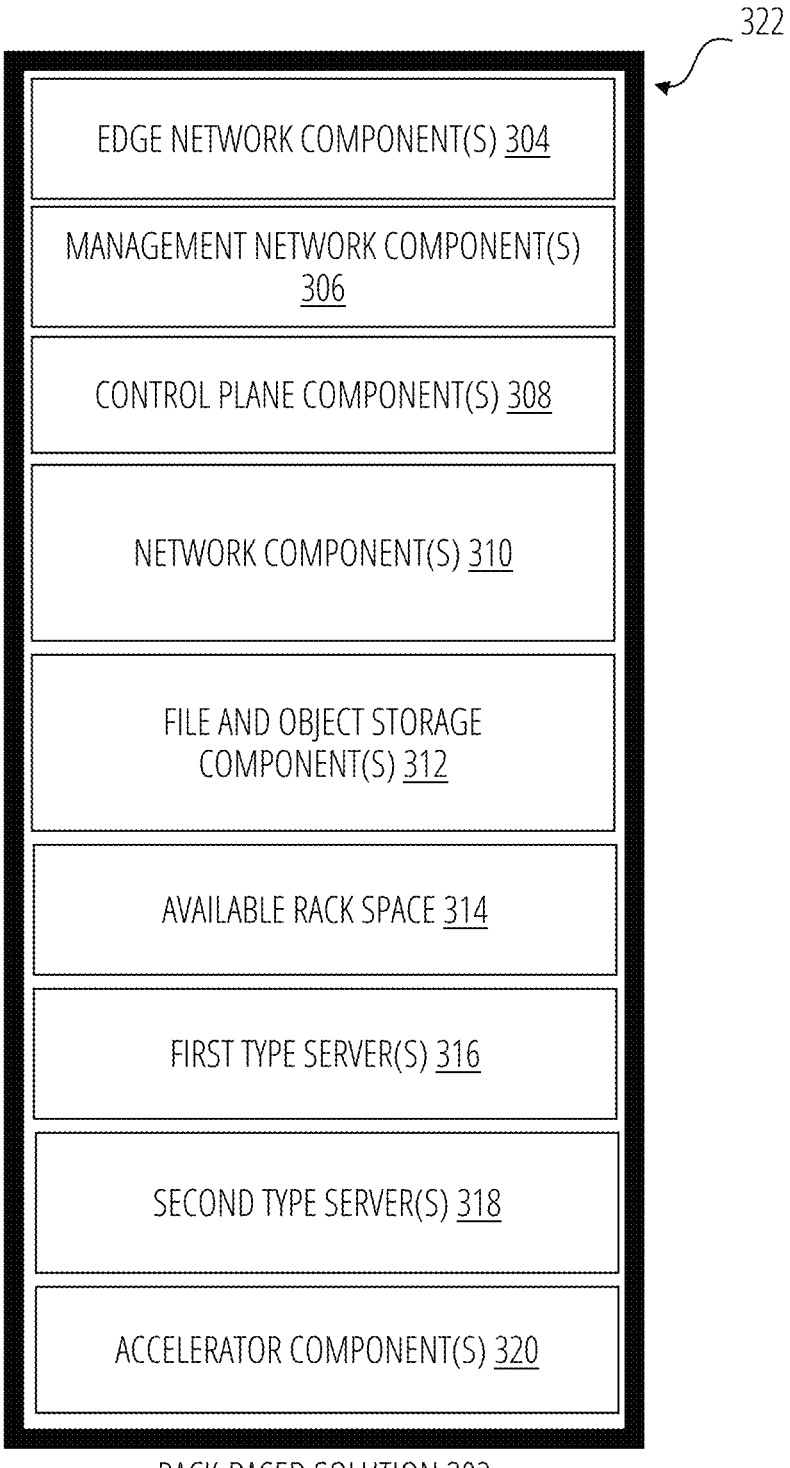
FIG. 3 is an example illustration of a rack-based solution.

During the design/customization of rack elevations phase rack placements for various components (e.g., servers, storage devices, network interfaces, power supplies) are determined based on, for example, power requirements, thermal boundaries and/or sizing boundaries. Other and/or different characteristics can be used during this phase to determine the placements and arrangements of various components. The design/customization of rack elevations phase involves placement of components within one or more racks so that the components from bill of materials 142 (or other source) have a designated location within the racks. Example rack-based solutions are illustrated in FIG. 2 and FIG. 3.

In an example, the placement of the components is performed by rack layout evaluation agent 134, which can include a first set of one or more microservices configured by solution designer backend 114 and using resources and/or additional information from one or more of supply chain tools 122, configuration tools 124, compatibility tools 126, power advisor tools 128, performance tools 130 and/or pricing tools 132. In an example, the first set of microservices parse bill of materials 142 including any configuration data included in bill of materials 142 and serialize the contents of bill of materials 142 into formats that can be used by the agents and tools of FIG. 1.

One or more users (e.g., product manager(s) 104, R&D engineer(s) 106, module designer(s) 108, solution architect(s) 110, automation engineer(s) 112) can edit or otherwise customize the contents of bill of materials 142 through solution designer interface 102. Thus, a user can use a bill of materials that corresponds to a pre-selected and pre-validated data center solution and modify it using solution designer interface 102 to generate a customized data center solution. Alternatively, a use can provide a proprietary bill of materials.

One type of output from the design/customization of rack elevations phase can be various files that indicate the selected rack placements for the various components, which can be, for example, graphical representations, coordinate representations, relative placements, etc. The outputs from design/customization of rack elevations phase can be used by subsequent phases and/or one or more of product manager(s) 104, R&D engineer(s) 106, module designer(s) 108, solution architect(s) 110, automation engineer(s) 112 to perform verification work or subsequent design work. Further, bill of materials 142 can be modified based on the outputs from design/customization of rack elevations phase.

During the generation/modification of point-to-point cabling connections phase point-to-point cabling limitations are derived from various sources, including internal databases (e.g., database 120) and/or external sources (e.g., configuration tools 124, pricing tools 132), for example. A second set of microservices configured by solution designer backend 114 and using resources and/or additional information from one or more of supply chain tools 122, configuration tools 124, compatibility tools 126, power advisor tools 128, performance tools 130 and/or pricing tools 132 design point-to-point cabling connections based on the placement of components from the design/customization of rack elevations phase and the point-to-point cabling limitations.

The point-to-point cabling connections as determined by the second set of microservices may differ from an original customized solution and/or an original bill of materials 142. That is, the component placement from the design/customization of rack elevations phase can change the specific cables necessary to provide the correct interconnection, which can be determined in the generation/modification of point-to-point cabling connections phase.

One type of output from the generation/modification of point-to-point cabling connections phase can be various files (e.g., spreadsheet, JSON) that indicate point-to-point cabling connections between components as arranged in the design/customization of rack elevations phase.

During the validations phase additional verifications in addition to the verifications performed in the previous phases can be performed with respect to characteristics that have not previously been validated, for example, noise considerations. Further validations and/or evaluations with respect to end-of-life (EoL) timing and/or other long lead time factors can be evaluated during the validations phase. In an example, the bill of materials can be verified against various internal (e.g., validation agent(s) 138) and/or external (e.g., power advisor tools 128, performance tools 130) modules. Outputs from the validations phase (e.g., reports and results 144) can include, for example, EoL timing reports, lead time based ordering reports, other validation results that may result in modification to the bill of materials for the proposed solution.

The review/cloning phase more detailed design guidelines may be applied utilizing services like cloning, access control lists (ACLs), submit checks and the like. The review/cloning phase can be considered a final fine tuning where more detailed checks and modifications can be made.

In an example, solution designer interface 102 can provide a user interface accessible by various individuals and/or groups involved in the process of designing a data center solution. Example individuals and/or groups that may utilize solution designer interface 102 include, for example, product manager(s) 104, R&D engineer(s) 106, module designer(s) 108, solution architect(s) 110, automation engineer(s) 112, etc. Additional and/or different individuals/groups can also use solution designer interface 102.

In an example, solution designer interface 102 provides various features for designing data center solutions. For example, solution designer interface 102 may provide a GUI through which a user can provide parameters for the desired data center solution. Solution designer interface 102 may allow a user to generate a bill of materials that can be subsequently configured, verified and processed to generate a functional data center solution. As another example, solution designer interface 102 can accept a complete or partial bill of materials from a user that can be the basis of a data center solution.

Solution designer interface 102 can also provide additional functionality including, for example, the ability for various groups (e.g., R&D engineer(s) 106 and solution architect(s) 110) to share designs. Further, solution designer interface 102 can be part of a larger data center related suite of services that provide functionality beyond what is described with respect to data center solution design and verification.

Solution designer interface 102 can communicate with solution designer backend 114 via designer API 116, which can represent any number of APIs. Designer API 116 allows solution designer interface 102 to utilize the functionality of solution designer backend 114 to provide the described services through solution designer interface 102.

In an example, the solution designer mechanism can work with a bill of materials to design a solution based on the components of the bill of materials. The bill of materials can be rendered in rack layouts, for example, that solution architects can utilize to accomplish a solution design process. As described in greater detail below, the solution designer mechanism can provide one or more of the following design phases to accomplish the solution design task. Solution designer interface 102 can be a platform through which pre-defined layouts are provided that can be customized by one or more users.

In an example, once a bill of materials is created through (or provided to) solution designer interface 102, a set of microservices can be utilized to parse the bill of materials and any configuration information associated with the bill of materials. In an example, the microservices can serialize the bill of materials and/or configuration information into a common format that can be used by various models and tools. The parsing microservices can be coordinated by solution designer backend 114 and can be provided by a remote tool, or the parsing microservices can be provided by solution designer backend 114.

In an example, after the bill of materials modules and any associated configuration information is imported, users can start the design process through solution designer interface 102 to customize and/or configure the components of the bill of materials to generate a proposed data center solution. In an example, solution designer interface 102 can provide graphical representations of racks and modules that can be customized by users. To begin the custom design process users can arrange various modules (e.g., compute, storage, network) within the selected racks. The configuration can be based on the bill of materials and/or the configuration can result in modifications to the bill of materials corresponding to the customizations made by the users.

The placement and/or modifications of modules within the selected racks can be guided by (or constrained by) rack layout evaluation agent 134, which can impose constraints that are maintained by solution designer backend 114 by rack layout evaluation agent 134 and/or database 120, for example. Solution designer backend 114 can also obtain relevant information from one or more external tools through connectors 118 that can provide interfaces (e.g., APIs) to acquire information from external tools.

For example, rack layout evaluation agent 134 can obtain information from configuration tools 124, power advisor tools 128 and/or performance tools 130 to constrain module placement by users. In an example, module placements can revolve around horizontal and/or vertical placement affinity within power/thermal envelopes using recommendations from rack layout evaluation agent 134. Rack layout evaluation agent 134 can provide most of the functionality of the design/customization of rack elevations phase discussed above.

When the layout/arrangement is completed and various checks and validations provided by rack layout evaluation agent 134 are completed point-to-point connections are determined for the modules in the proposed solution. Point-to-point connections can be generated by point-to-point agent 136 and/or by a user with guidance or validation provided by point-to-point agent 136. Point-to-point agent 136 can use external tools (e.g., supply chain tools 122, configuration tools 124, pricing tools 132) accessible through connectors 118 to provide point-to-point connections or guidance/validation for point-to-point connections. Some desired module placements can have an effect on the bill of materials by causing a need for long point-to-point connections, high-density power modules, large hard drives and/or highly-optimized GPU modules, which can cause an update or suggested update to the bill of materials. Point-to-point agent 136 can provide most of the functionality of the generation/modification of point-to-point cabling connections phase discussed above.

In an example, the module placements from the design/customization of rack elevations phase can cause changes to the original point-to-point connections as originally associated with the BoM. If the users customize the point-to-point connections point-to-point agent 136 can verify the connections based on, for example, various policy rules (e.g., maintained on database 120 and/or from configuration tools 124). This can result in an update to cables included in the BoM, for example, different lengths and/or other characteristics.

Validation agent(s) 138 can perform various types of validations on the components in the bill of materials. Some validations can be based on supply chain status information and/or lead time information. Supply chain status information can include information such as, for example, available inventory levels, prices, volume discount information, shipping information, future supply information, end of life information, support information, etc. Similarly, lead time information can include information such as, for example, how much time is required for an item that is custom ordered/configured, an estimate for a time that a backordered item will become available, etc.

These validations can include, for example, determining if any modules are nearing their end of life (EoL). This can be determined from information from database 120 and/or various external sources (e.g., supply chain tools 122, performance tools 130, pricing tools 132). Other validations can determine if one or more modules are rare, difficult to source, are particularly expensive, require a long lead time, etc. In response to these validations, the bill of materials can be updated and/or users can be notified so that they have the option to update the bill of materials or authorize use of modules flagged through validation. Validation agent(s) 138 can provide most of the functionality of the validations phase discussed above.

When the validations have been processed by, for example, updates to the bill of materials and/or overrides from one or more users, the validated solution can be locked in and the solution can move towards implementation. This can include reports and artifacts agent(s) 140 generating information for various parties involved in implementing the verified solution. Reports and artifacts can include, for example, point-to-point cabling charts, parts lists, module rack locations, power utilization specifications, color coding, order lead times for various modules, price reports, module life expectancies, performance projections, etc. Reports and artifacts agent(s) 140 can provide most of the functionality of the review/cloning phase discussed above.

In an example, the various agents (e.g., rack layout evaluation agent 134, point-to-point agent 136, validation agent(s) 138, reports and artifacts agent(s) 140) illustrated in FIG. 1 can be implemented as hardware, software or a combination thereof. In other examples, one or more of the various agents of FIG. 1 can be implemented as a set of one or more microservices.

FIG. 2 is an example illustration of a rack-based solution. The example solution illustrated in FIG. 2 can be used in a data center intended to provide a relatively high density of virtual machine (VM) instances.

The components of rack-based solution 202 can be provided as a bill of materials or can be the result of a modified bill of materials that has been updated according to the approach described herein. The example of FIG. 2 is based on a single rack (e.g., rack 218); however, other examples including multiple racks (having the same configuration as rack 218 or having a different configuration) can also be supported utilizing the approach described.

The bill of materials (not illustrated in FIG. 2) can indicate one or more of network component(s) 204, management network component(s) 206, gateway component(s) 208, storage component(s) 210, first type server(s) 214 and second type server(s) 216 as well as additional information including point-to-point cabling connections between the illustrated components. The bill of materials can include the appropriate cables, connectors, organizers and the like to allow the point-to-point cabling design to be accomplished.

If not all of the rack space is used, available rack space 212 can be designated for future expansion, cooling and/or other purposes.

The example solution of FIG. 2 is a VM-based solution where first type server(s) 214 and second type server(s) 216 provide the desired VM/container density. In an example, the bill of materials can specify the desired number of servers (e.g., first type server(s) 214, second type server(s) 216). In another example, the bill of materials can indicate the desired VM/container density and/or other specifications or characteristics that can allow the solution designer mechanism to determine the number and type of servers to be included in the final architecture.

Storage component(s) 210 can provide storage functionality for the servers and/or other components of rack-based solution 202. Similarly, network component(s) 204, management network component(s) 206 and gateway component(s) 208 can provide the networking access and security as specified in the bill of materials and/or can be selected based on specifications/characteristics provided.

In response to selection and/or refinement of the components for rack-based solution 202, point-to-point cabling specifications can be determined according to the approach described. Bill of materials validations (e.g., to find missing parts, missing cables), lead time management, and/or generation of relevant artifacts for supply chain/factory use. In an example, the solution designer mechanism can generate point-to-point cabling connection files that can be used by an automation engine to build/configure the designed solution. The various validation and review processes described above can then be performed and the output reports and results can be generated.

FIG. 3 is an example illustration of a rack-based solution. The example solution illustrated in FIG. 3 can be used in a data center intended to provide a relatively high density of high frequency central processing units (CPUs) and supporting computational accelerator graphics processing units (GPUs) that can be used, for example, in artificial intelligence (AI) environments.

The components of rack-based solution 302 can be provided as a bill of materials or can be the result of a modified bill of materials that has been updated according to the approach described herein. The example of FIG. 3 is based on a single rack (e.g., rack 322); however, other examples including multiple racks (having the same configuration as rack 322 or having a different configuration) can also be supported utilizing the approach described.

The bill of materials (not illustrated in FIG. 3) can indicate one or more of edge network component(s) 304, management network component(s) 306, control plane component(s) 308, network component(s) 310, file and object storage component(s) 312, first type server(s) 316, second type server(s) 318 and accelerator component(s) 320 as well as additional information including point-to-point cabling connections between the illustrated components. The bill of materials can include the appropriate cables, connectors, organizers and the like to allow the point-to-point cabling design to be accomplished. If not all of the rack space is used, available rack space 314 can be designated for future expansion, cooling and/or other purposes.

The example solution of FIG. 3 is a high-speed computational solution where first type server(s) 316 and second type server(s) 318 provide the desired computational power and density and can function with accelerator component(s) 320 to provide accelerated computational functionality. In an example, the bill of materials can specify the desired number of servers and accelerator components (e.g., first type server(s) 316, second type server(s) 318, accelerator component(s) 320). In another example, the bill of materials can indicate the desired computational functionality and/or other specifications or characteristics that can allow the solution designer mechanism to determine the number and type of servers and accelerators to be included in the final architecture.

File and object storage component(s) 312 can provide storage functionality for the servers, accelerators and/or other components of rack-based solution 302. Similarly, edge network component(s) 304, management network component(s) 306 and network component(s) 310 and control plane component(s) 308 can provide the networking access and security as specified in the bill of materials and/or can be selected based on specifications/characteristics provided.

In response to selection and/or refinement of the components for rack-based solution 302, point-to-point cabling specifications can be determined according to the approach described. Bill of materials validations (e.g., to find missing parts, missing cables), lead time management, and/or generation of relevant artifacts for supply chain/factory use. In an example, the solution designer mechanism can generate point-to-point cabling connection files that can be used by an automation engine to build/configure the designed solution. The various validation and review processes described above can then be performed and the output reports and results can be generated.

FIG. 4 is a flow diagram for one example technique for providing a solution designer mechanism. The techniques of FIG. 4 can be provided by an architecture such as the example architecture of FIG. 1. Alternative architectures can also be utilized to provide the functionality of FIG. 4.

A list of elements corresponding to a proposed data processing architecture is received, 402. The list of elements (e.g., computing resources, storage resources and connection resources) can be provided as a bill of materials, for example, or can be created through use of a user interface. The list of elements can be received from one or more users having various roles and responsibilities (e.g., product manager(s) 104, R&D engineer(s) 106, module designer(s) 108, solution architect(s) 110, automation engineer(s) 112).

A physical layout of the computing resources and the storage resources from the list of elements is evaluated using a first set of microservices, 404. In an example, the first set of microservices parse configuration data for the computing resources and the storage resources and can evaluate a proposed configuration for the computing resources and storage resources. The first set of microservices can be coordinated by a solution designer mechanism (e.g., solution designer interface 102, solution designer backend 114, designer API 116, or similar architecture).

The point-to-point connections between the computing resources and the storage resources in the proposed configuration are verified using a second set of microservices, 406. The second set of microservices can be coordinated by a solution designer mechanism (e.g., solution designer interface 102, solution designer backend 114, designer API 116, or similar architecture).

The list of elements is updated based on the evaluation of the physical layout and the point-to-point connections, 408. This can be a update to the bill of materials originally uploaded to the solution designer mechanism or the bill of materials created by users of the solution designer mechanism. The updates can be to any of the components in the bill of materials and/or addition of components to the bill of materials. In an example, the previous process can be repeated so that multiple updates to the list of elements can be performed.

Supply chain status information and/or lead time information for at least a subset of the list of elements using a third set of microservices can be obtained, 410. The supply chain status information and/or the lead time information can be obtained from a source internal to the solution designer mechanism or from a source external to the solution designer mechanism (e.g., supply chain tools 122, pricing tools 132). Supply chain status information can include information such as, for example, available inventory levels, prices, volume discount information, shipping information, future supply information, end of life information, support information, etc. Similarly, lead time information can include information such as, for example, how much time is required for an item that is custom ordered/configured, an estimate for a time that a backordered item will become available, etc.

A solution architecture based on the updated list of elements, the physical layout, the verified point-to-point connections and the supply chain status information with physical configurations of the computing resources and storage resources with corresponding point-to-point connections and supply chain status information is generated for the updated list of elements, 412. In an example, the solution architecture can have associated reports and results (e.g., reports and results 144) that can be provided to various entities responsible for acquiring components, assembling the components, delivering the components, configuring the components, etc.

FIG. 5 is a block diagram of one example of a processing system that can provide a solution designer mechanism. In an example, system 514 can include processor(s) 516 and non-transitory computer readable storage medium 518. non-transitory computer readable storage medium 518 may store instructions 502, 504, 506, 508, 510 and 512 that, when executed by processor(s) 516, cause processor(s) 516 to perform various functions. Examples of processor(s) 516 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 518 include tangible media such as random access memory (RAM), read-only memory (ROM), electrically erasable programmable read-only memory (EEPROM), flash memory, a hard disk drive, etc. System 514 can be part of a larger platform including additional components (not illustrated in FIG. 5) including, for example, input/output (I/O) devices, network interfaces, etc.

Instructions 502 cause processor(s) 516 to receive a list of elements corresponding to a proposed data processing architecture. The list of elements (e.g., computing resources, storage resources and connection resources) can be provided as a bill of materials, for example, or can be created through use of a user interface. The list of elements can be received from one or more users having various roles and responsibilities (e.g., product manager(s) 104, R&D engineer(s) 106, module designer(s) 108, solution architect(s) 110, automation engineer(s) 112).

Instructions 504 cause processor(s) 516 to evaluate a physical layout of the computing resources and the storage resources from the list of elements using a first set of microservices. In an example, the first set of microservices parse configuration data for the computing resources and the storage resources and can evaluate a proposed configuration for the computing resources and storage resources. The first set of microservices can be coordinated by a solution designer mechanism (e.g., solution designer interface 102, solution designer backend 114, designer API 116, or similar architecture).

Instructions 506 cause processor(s) 516 to verify point-to-point connections between the computing resources and the storage resources in the proposed configuration using a second set of microservices. The second set of microservices can be coordinated by a solution designer mechanism (e.g., solution designer interface 102, solution designer backend 114, designer API 116, or similar architecture).

Instructions 508 cause processor(s) 516 to update the list of elements based on the evaluation of the physical layout and the point-to-point connections. This can be an update to the bill of materials originally uploaded to the solution designer mechanism or the bill of materials created by users of the solution designer mechanism. In an example, the previous process can be repeated so that multiple updates to the list of elements can be performed.

Instructions 510 cause processor(s) 516 to determine supply chain status information and lead time information for at least a subset of the list of elements using a third set of microservices. The supply chain status information and/or the lead time information can be obtained from a source internal to the solution designer mechanism or from a source external to the solution designer mechanism (e.g., supply chain tools 122, pricing tools 132). Supply chain status information can include information such as, for example, available inventory levels, prices, volume discount information, shipping information, future supply information, end of life information, support information, etc. Similarly, lead time information can include information such as, for example, how much time is required for an item that is custom ordered/configured, an estimate for a time that a backordered item will become available, etc.

Instructions 512 cause processor(s) 516 to generate a solution architecture based on the updated list of elements, the physical layout, the verified point-to-point connections and the supply chain status information with physical configurations of the computing resources and storage resources with corresponding point-to-point connections and supply chain status information for the updated list of elements.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 518 has stored thereon data representing sequences of instructions that, when executed by a processor(s) 516, cause the processor(s) 516 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A system comprising:

a processor; and a memory coupled with the processor, the memory storing instructions that, when executed by the processor cause the processor to:

receive a list of elements corresponding to a proposed data center solution, the list of elements comprising at least computing resources, storage resources and connection resources, wherein the proposed data center solution comprises at least a first configuration of the computing resources, the storage resources and the connection resources;

execute a first set of microservices to evaluate a physical layout of the computing resources and the storage resources from the list of elements, wherein executing the first set of microservices comprises parsing configuration data associated with the computing resources and the storage resources and evaluating the first configuration for the computing resources, the storage resources and the connection resources by communicating, via a set of application programming interfaces (APIs), with an external configuration tool containing a set of policies;

execute a second set of microservices to evaluate point-to-point connections between the computing resources and the storage resources utilizing the connection resources in the first configuration;

update the list of elements to correspond to a second configuration based on the evaluation of the physical layout and the point-to-point connections;

execute a third set of microservices to determine supply chain status information and lead time information for at least a subset of the updated list of elements;

generate a final data center solution based on the updated list of elements, the physical layout, the point-to-point connections and the supply chain status information, wherein the final data center solution comprises physical configurations of the computing resources and the storage resources with corresponding point-to-point connections therebetween and supply chain status information for the updated list of elements; and facilitate implementation of the final data center solution by providing the final data center solution to various parties involved in the implementation to build the data center.

2. The system of claim 1 wherein the list of elements corresponding to the proposed data center solution are received via a graphical user interface (GUI).

3. The system of claim 1 wherein the list of elements corresponding to the proposed data center solution are received via an application program interface (API).

4. The system of claim 1 wherein executing the first set of microservices further comprises determining rack positions for the computing resources and the storage resources.

5. The system of claim 4 wherein the rack positions for the computing resources and for the storage resources are based on element size and corresponding power requirements.

6. The system of claim 5 wherein the rack positions for the computing resources and for the storage resources are based on horizontal or vertical placement affinity within a power or thermal envelope using recommendations acquired by a solution designer backend from a remote resource.

7. The system of claim 1 wherein evaluating point-to-point connections between the computing resources and the storage resources in the proposed configuration comprises:

determining point-to-point connections between the computing resources and the storage resources to support functionality of the proposed data center solution;

updating the list of elements with cables having specifications based on the determined point-to-point connections.

8. A non-transitory computer-readable medium having stored thereon instructions that, when executed by a processor, cause the processor to:

receive a list of elements corresponding to a proposed data center solution, the list of elements comprising at least computing resources, storage resources and connection resources, wherein the proposed data center solution comprises at least a first configuration of the computing resources, the storage resources and the connection resources;

execute a first set of microservices to evaluate a physical layout of the computing resources and the storage resources from the list of elements, wherein executing the first set of microservices comprises parsing configuration data associated with the computing resources and the storage resources and evaluating the first configuration for the computing resources, the storage resources and the connection resources by communicating, via a set of application programming interfaces (APIs), with an external configuration tool containing a set of policies;

execute a second set of microservices to evaluate point-to-point connections between the computing resources and the storage resources utilizing the connection resources in the first configuration;

update the list of elements to correspond to a second configuration based on the evaluation of the physical layout and the point-to-point connections;

execute a third set of microservices to determine supply chain status information and lead time information for at least a subset of the updated list of elements;

generate a final data center solution based on the updated list of elements, the physical layout, the point-to-point connections and the supply chain status information, wherein the final data center solution comprises physical configurations of the computing resources and the storage resources with corresponding point-to-point connections therebetween and supply chain status information for the updated list of elements; and facilitate implementation of the final data center solution by providing the final data center solution to various parties involved in the implementation to build he data center.

9. The non-transitory computer-readable medium of claim 8 wherein the list of elements corresponding to the proposed data center solution are received via a graphical user interface (GUI).

10. The non-transitory computer-readable medium of claim 8 wherein the list of elements corresponding to the proposed data center solution are received via an application program interface (API).

11. The non-transitory computer-readable medium of claim 8 wherein executing the first set of microservices further comprises determining rack positions for the computing resources and the storage resources.

12. The non-transitory computer-readable medium of claim 11 wherein the rack positions for the computing resources and for the storage resources are based on element size and corresponding power requirements.

13. The non-transitory computer-readable medium of claim 12 wherein the rack positions for the computing resources and for the storage resources are based on horizontal or vertical placement affinity within a power or thermal envelope using recommendations acquired by a solution designer backend from a remote resource.

14. The non-transitory computer-readable medium of claim 8 wherein evaluating point-to-point connections between the computing resources and the storage resources in the proposed configuration comprises:

determining point-to-point connections between the computing resources and the storage resources to support functionality of the proposed data center solution;

updating the list of elements with cables having specifications based on the determined point-to-point connections.

15. A method comprising:

receiving a list of elements corresponding to a proposed data center solution, the list of elements comprising at least computing resources, storage resources and connection resources, wherein the proposed data center solution comprises at least a first configuration of the computing resources, the storage resources and the connection resources;

execute a first set of microservices to evaluate a physical layout of the computing resources and the storage resources from the list of elements, wherein executing the first set of microservices comprises parsing configuration data associated with the computing resources and the storage resources and evaluating the first configuration for the computing resources, the storage resources and the connection resources by communicating, via a set of application programming interfaces (APIs), with an external configuration tool containing a set of policies;

execute a second set of microservices to evaluate point-to-point connections between the computing resources and the storage resources utilizing the connection resources in the first configuration;

updating the list of elements to correspond to a second configuration based on the evaluation of the physical layout and the point-to-point connections;

execute a second set of microservices to determine supply chain status information and lead time information for at least a subset of the updated list of elements;

generating a final data center solution based on the updated list of elements, the physical layout, the point-to-point connections and the supply chain status information, wherein the final data center solution comprises physical configurations of the computing resources and the storage resources with corresponding point-to-point connections therebetween and supply chain status information for the updated list of elements; and facilitating implementation of the final data center solution by providing the final data center solution to various parties involved in the implementation to build the data center.

16. The method of claim 15 wherein the list of elements corresponding to the proposed data center solution are received via a graphical user interface (GUI).

17. The method of claim 15 wherein the list of elements corresponding to the proposed data center solution are received via an application program interface (API).

18. The method of claim 15 wherein executing the first set of microservices further comprises determining rack positions for the computing resources and the storage resources.

19. The method of claim 15 wherein the rack positions for the computing resources and for the storage resources are based on element size and corresponding power requirements and the rack positions for the computing resources and for the storage resources are based on horizontal or vertical placement affinity within a power or thermal envelope using recommendations acquired by a solution designer backend from a remote resource.

20. The method of claim 15 wherein evaluating point-to-point connections between the computing resources and the storage resources in the proposed configuration comprises:

determining point-to-point connections between the computing resources and the storage resources to support functionality of the proposed data center solution;

updating the list of elements with cables having specifications based on the determined point-to-point connections.

* * * * *